(12) United States Patent
Leynaert

(10) Patent No.: US 6,257,675 B1
(45) Date of Patent: Jul. 10, 2001

(54) MOUNTED TIRE/WHEEL ASSEMBLY HAVING A HUBCAP

(75) Inventor: Sylvain Leynaert, Entraigues (FR)

(73) Assignee: Compagnie Générales des Etablissements Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/334,516

(22) Filed: Jun. 16, 1999

(30) Foreign Application Priority Data

Jun. 25, 1998 (FR) .................................................. 98 08112

(51) Int. Cl.$^7$ ...................................................... B60B 7/01
(52) U.S. Cl. ...................................... 301/37.23; 301/108.1
(58) Field of Search ................................ 301/37.1, 37.22, 301/37.23, 37.24, 37.25, 37.27, 108.1, 108.3; 40/587; 152/523, 154

(56) References Cited

U.S. PATENT DOCUMENTS

| | | | |
|---|---|---|---|
| 1,167,124 | * | 1/1916 | Sloper ................................ 301/37.1 |
| 1,448,286 | * | 3/1923 | Comstock .......................... 301/37.1 |
| 1,753,519 | * | 4/1930 | Kanner ............................... 301/37.1 |
| 2,548,070 | * | 4/1951 | Ryan ................................. 301/37.26 |
| 2,937,903 | * | 5/1960 | Wood ................................ 301/37.23 |
| 2,963,326 | | 12/1960 | Wood . |
| 2,973,992 | * | 3/1961 | Shoemaker ....................... 301/37.22 |
| 3,012,821 | | 12/1961 | Shoemaker . |
| 3,050,338 | * | 8/1962 | Lyon ................................. 301/37.23 |
| 3,128,815 | * | 4/1964 | Nonnamaker .................... 301/37.22 |
| 4,318,436 | * | 3/1982 | Shurman .......................... 301/37.1 |
| 4,678,239 | * | 7/1987 | Matsushita ....................... 301/37.1 |
| 5,316,376 | * | 5/1994 | Defreitas ......................... 301/37.26 |
| 5,490,342 | * | 2/1996 | Rutterman et al. ............... 301/37.1 |

FOREIGN PATENT DOCUMENTS

| | | | |
|---|---|---|---|
| 219983 | * | 1/1959 | (AU) .................................. 301/37.1 |
| 76598 | * | 5/1948 | (CS) .................................. 301/37.1 |
| 1079980 | * | 4/1960 | (DE) ................................ 301/37.22 |
| 79000425 | * | 7/1979 | (WO) ............................... 301/37.22 |

OTHER PUBLICATIONS

T. Handa, "Plastic Wheel Cover," Japanese Patent Office, pp. 1–7, Aug. 1988.*

* cited by examiner

*Primary Examiner*—S. Joseph Morano
*Assistant Examiner*—Long Bae Nguyen
(74) *Attorney, Agent, or Firm*—Baker Botts L.L.P.

(57) ABSTRACT

A mounted assembly of a mounting wheel, a tire provided with sidewalls between a tread and parts of the tire intended to come in contact with said wheel after mounting of the tire on the wheel and a wheel hubcap fastened to the wheel. The mounted assembly is characterized in that one of the sidewalls cooperates with the hubcap to secure a good angular position of the hubcap in relation to said sidewall as well as to maintain the angular position during the use of the assembly on the vehicle.

11 Claims, 2 Drawing Sheets

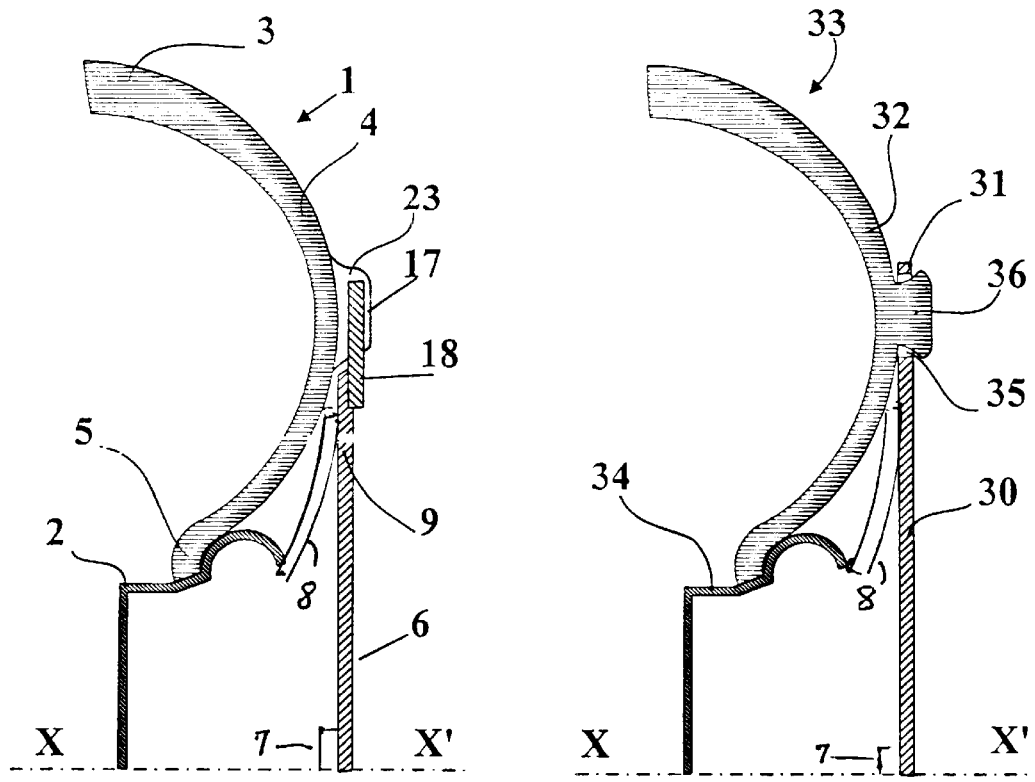
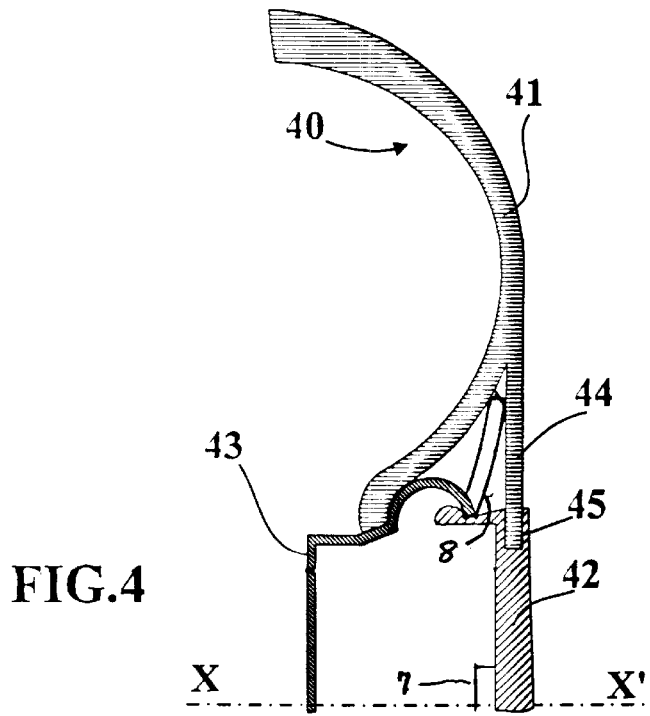

MOUNTED TIRE/WHEEL ASSEMBLY HAVING A HUBCAP

BACKGROUND OF THE INVENTION

The invention relates to assemblies consisting of a tire mounted on a wheel and intended to be mounted on a vehicle and, in particular, assemblies containing a part forming a wheel hubcap designed, in particular, to mask said wheel and to present a wall surface visually more attractive and aesthetic than the wheel.

Taking the aesthetics and purely ornamental appearance into account in making a tire assembly mounted on a wheel for the vehicles designed today is acquiring ever greater importance. The designers of said assemblies are sometimes led to create ornamental motifs which occupy the outer surface of the tire (particularly the sidewall part extending between the tread and the part of the tire in contact with the wheel) as well as the surface of the hubcap equipping the wheel on which the tire is mounted.

In this context, it can be of great interest from an ornamental standpoint to create a motif presenting an overall unity on the visible surface of the hubcap as well as on the visible outer surface of the tire. A motif presenting an overall unity is understood to be a motif not presenting any apparent visual interruption between the surface of a decorated sidewall and the visible surface of the hubcap situated beside the decorated sidewall.

In the case of a motif presenting an overall unity, a first problem arises after mounting of the tire on its wheel at the time of placement of the hubcap: it is sometimes difficult to position the hubcap correctly in relation to the motif of the tire so as to repeat the unbroken motif between the part of said motif present on the sidewall and the part present on the hubcap; that is all the more true as said motif is not necessarily repetitive circumferentially and it is then imperative to match said two parts perfectly in order to come up with the desired ornamental motif.

Furthermore, it is often found, after rolling of the tire/wheel assembly mounted on a vehicle, that the tire has turned slightly on its wheel under the effect of the stresses exerted by the road on said tire and resulting from repeated accelerations and/or brakings of the vehicle; that rotation of the tire on its wheel, which does not at all affect operation of the mounted assembly, does lead, however, to a break of continuity of the initial ornamental motif between the hubcap and the sidewall of the tire.

SUMMARY OF THE INVENTION

To solve those problems, the invention proposes a mounted assembly intended to equip a vehicle and comprising f a mounting wheel and a tire provided with sidewalls securing the attachment between a tread and the parts of said tire designed to come in contact with said wheel after mounting of the tire on said wheel. Said mounted assembly also includes an element forming a hubcap fastened to the wheel so as to prevent any movement in relation to each other in the axial direction of the mounted assembly, while allowing a rotation of said hubcap relative to said wheel.

The mounted assembly is characterized in that means of attachment between the hubcap and one of the sidewalls are provided, so that said sidewall will cooperate with the hubcap in order to secure a good angular position of the hubcap in relation to said sidewall as well as to maintain said position during use of the mounted assembly on a vehicle.

In this way, possible rotary movements of the tire relative to its mounting wheel, during rolling of a vehicle equipped with said assembly, is fully transmitted to the hubcap attached to said tire. Thus, the problems mentioned above are thereafter solved, since the means of the invention make it possible easily to bring the ornamental motifs created on the hubcap and on one of the sidewalls of a tire into concordance and also to preserve said concordance during rolling.

In a first embodiment, the mounted assembly according to the invention is characterized in that the hubcap contains at least one extension projecting radially to one of the sidewalls of the tire, each extension having a deformation elasticity suitable for following the deformations of the sidewall during rolling, and in that means of attachment are provided on said sidewall to secure and preserve the angular position of the hubcap relative to said sidewall.

In a second embodiment of a mounted assembly according to the invention, at least one of the sidewalls of the tire contains at least one extension projecting radially to the axis of rotation of the tire in order to cooperate with seats provided on the hubcap, so as to secure and preserve the angular position of the hubcap relative to said sidewall.

The invention will be better understood by reading the specification associated with the figures, the object of which is to present in nonlimitative manner working variants.

DESCRIPTION OF THE DRAWINGS

FIG. 2 shows a cross section along A—A of the mounted assembly represented in FIG. 1;

FIG. 3 shows a cross section of a variant of a mounted assembly according to the invention, containing an opening provided to let through a rubber protuberance molded on a sidewall;

FIG. 4 shows a cross section of a variant of a mounted assembly according to the invention, in which one of the sidewalls contains extensions projecting radially inward in order to cooperate with a hubcap.

DESCRIPTION OF PREFERRED EMBODIMENTS

Figure 1:
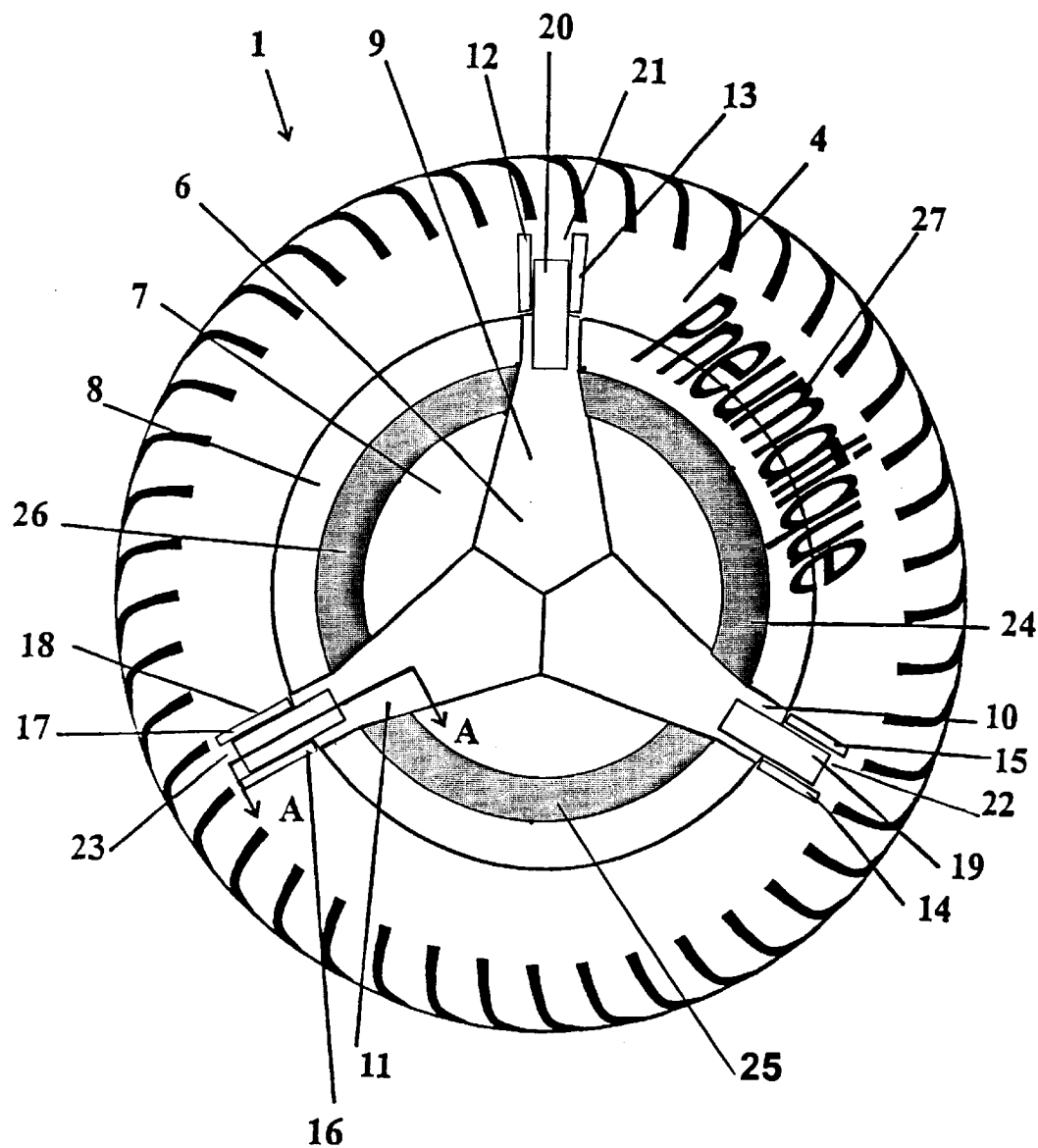
FIG. 1 shows a mounted assembly formed by a tire mounted on its mounting wheel and a hubcap containing a radial extension in the form of a crown extending radially to about half the height of one of the sidewalls of a tire.

FIG. 1 shows a mounted assembly of a tire 1 mounted and inflated on its mounting wheel 2 visible on the section along A—A represented in FIG. 2. The tire 1 comprises a tread 3 extended at its axial ends by sidewalls 4, each sidewall ending at the mounting wheel 2 in parts 5 forming beads of the tire (visible in FIG. 2) and intended to secure contact with said wheel, once the tire is mounted on its mounting wheel.

A hubcap 6 is set in place on the wheel and is maintained axially relative to said wheels by customary means not represented, so as to be able to turn freely on an axis which merges with the axis of rotation XX' of said wheel. This hubcap 6 contains, on the periphery of a disk-shaped center part 7 largely masking the wheel, a crown 8 joined to said center part 7 by three arms 9, 10, 11. The crown 8 extends radially beyond the wheel and partly covers one of the sidewalls 4 of the tire.

The crown 8 of the hubcap 6 is radially extended by three brackets 18, 19, 20 sliding in the radial direction (that is, roughly perpendicular to the axis of rotation of the mounted assembly) relative to said crown and forming radial extensions that can project to about half the height of one of the sidewalls.

The height of a sidewall is understood to be the radial distance separating the axially outermost end of the tread of the tire and the part of the sidewall closest to the mounting wheel, when the tire is mounted on said wheel.

On the sidewall 4 of the tire, three pairs of ribs (12, 13), (14, 15), (16, 17) roughly radially oriented are molded at the time of manufacture of said tire. Each pair of ribs defenses a space serving as seat 21, 22, 23 for a radial extension of the hubcap 6. The three pairs of ribs are so arranged on the sidewall that each pair is approximately 120° from the other two.

After having mounted the tire on the wheel and installed the hubcap, the angular position of said hubcap is adjusted in relation to the tire by turning it to the desired position, and the hubcap 6 is then locked in that position by sliding the brackets 18, 19, 20 into the spaces 21, 22, 23. As represented, it is possible to make the ornamental motifs drawn on one of the sidewalls 4 and on the crown 8 of the hubcap 6 coincide, so as to reconstitute an overall motif 27 forming, for example, the word "Pneumatique".

In addition, means, not represented here, can be provided to lock said brackets in this position in order to prevent their radial displacement out of their seats.

Three windows 24, 25, 26 formed on the hubcap 6 and separating the disk 7 from the crown 8 of said hubcap can also be distinguished in FIG. 1; one of these windows is designed to afford access to a tire valve. However, it is not indispensable to provide these windows, since it is possible to change the inflation pressure of the tire by removing the hubcap in order to access the valve and then replacing said hubcap in the proper position.

FIG. 2 represents the partial cross section along A—A of the mounted assembly of FIG. 1 (section containing the axis of rotation of the mounted assembly); on that schematic section, one can distinguish an arm 11 of the hubcap 6 extended radially by a sliding bracket 18 which is inserted between the two ribs 16, 17 oriented roughly radially, said ribs cooperating with the bracket 18 to prevent virtually any displacement of said hubcap relative to the tire 1 circumferentially and so as to maintain the conformity of the ornamental motifs made on said hubcap and said tire.

Each rib 16, 17 can be made by means of a series of small protuberances aligned in the same direction and molded on the surface of at least one sidewall.

A variant of the arrangement just presented consists of forming on at least one sidewall of the tire at least one groove (incised) oriented in a roughly radial direction. Roughly radial orientation is understood to mean that the average orientation of the groove is such that its edges virtually prevent any circumferential displacement of a radial extension of the hubcap, once that extension is in place in the seat formed by said groove.

It is also possible to provide on the hubcap a number of radial extensions at least equal to the number of seats provided on one of the sidewalls, each extension not sliding radially relative to said hubcap, but rather capable of being accommodated in a seat provided on one of the sidewalls of the tire at the time of mounting of the hubcap on the wheel bearing the tire.

During rolling, the tire undergoing more or less substantial bending strains in the part in contact with the road, it is preferable for the hubcap to have appropriate flexibility characteristics in order to follow said strains easily. One means of accomplishing this is to use a flexible material like rubber, for example, for manufacture of the hubcap. Let us remember that the hubcap, being attached to the wheel axially, cannot be ejected from the mounted assembly during rolling.

Another variant of attachment between a hubcap and a tire is shown in FIG. 3. This figure represents a schematic cross section of a mounted assembly consisting of a tire mounted on a wheel (the sectional plan contains the axis of rotation of the mounted assembly). Said figure shows only one part of a hubcap 30 containing a radial extension 31 in the form of a crown which extends to a sidewall 32 of a tire 33 and covers all of the portion of said sidewall situated between the mounting wheel 34 and the axially outermost points of the sidewall of the tire. The extension 31 contains an opening forming a hole 35 receiving at least one rubber protuberance 36 molded (or glued) on the outer surface of the sidewall 32, so as to permit a relative adjustment of the position of the hubcap 30 in relation to said sidewall and to secure a mechanical attachment forcing said hubcap to follow the tire in its possible rotary movements relative to the wheel 34 under the action of the stresses exerted by the road in case of acceleration and/or braking as well as in the bending movements of the sidewall during rolling of the mounted assembly equipping a vehicle.

To allow a relative movement between the hubcap 30 and the tire 33 in a direction close to the radial direction, in particular, when said tire is loaded, it is preferable to arrange for the rubber protuberance 36 to be solely in contact with the lateral walls of each opening 35 of the hubcap (that is, the walls spaced circumferentially). In this way, the rubber protuberance 36 on the sidewall can move without any damage inside the opening 35 under the effect of flattening of the tire.

FIG. 4 shows, in cross section, another variant of a mounted assembly according to the invention and in which one of the sidewalls 41 of a tire 40 is provided with at least one rubber extension 44 projecting toward the smallest radii and covering at least partially the portion of the wheel 43 forming a wheel flange in contact with the tire. Each sidewall extension 44 cooperates with means provided on the hubcap 42 to secure good positioning of the hubcap relative to the tire and to preserve said configuration during use of the mounted assembly on a rolling vehicle.

The mounting of such an assembly is carried out by first mounting the tire on its mounting wheel with each sidewall extension passing over the wheel flange; after inflation of the tire, the hubcap is then set in place on the mounting wheel by lifting each sidewall extension 44, and then inserting each of said extensions in a seat 45 provided on the hubcap.

To obtain a better circumferential attachment between the hubcap and the tire, it can be arranged to glue the sidewall parts and the hubcap parts in contact.

According to the latter variant, it is also possible to envisage the case of a sidewall having an extension forming a crown, said crown being, for example, glued to a hubcap that is in turn axially fastened to the wheel.

A unitary ornamental motif can advantageously be created after assembly of the different parts (tire-wheel-hubcap) constituting the mounted assembly, since in this way, the necessary continuity is obtained and, in addition, the characteristics of the invention ensure the stability of such motif during rolling.

I claim:

1. An assembly designed for a vehicle and comprising a mounting wheel, a tire having sidewalls between a tread and beads of said tire which come in contact with said mounting wheel after mounting the tire on the wheel, and a wheel hubcap axially fastened on the wheel through the tire so as to be rotatably movable with the tire on said wheel, characterized in that one of the sidewalls cooperates with the hubcap to secure a desired annular position of the hubcap in relation to said sidewall and to maintain said annular position even if the tire should rotatably shift relative to the wheel during the use of the said assembly and in which the hubcap includes at least one extension projecting radially to one of the sidewalls of the tire, each extension having a deformation elasticity suitable for following the deformations of the sidewall during rolling, and in which a sidewall includes means to secure the extension and preserve the angular position of the hubcap relative to said sidewall.

2. An assembly according to claim 1, including at least one groove, oriented in a direction other than circumferential is molded on the outside of at least one sidewall of the tire in order to cooperate with said radial extension and to integrate the tire and the hubcap circumferentially.

3. An assembly according to claim 1, including at least two protuberances spaced circumferentially on the outside of at least one of the sidewalls to form a seat designed to receive a radial extension of the hubcap.

4. An assembly according to claim 2, including at least one sliding bracket on the hubcap and a seat on the sidewall, said bracket being able to slide radially outwardly into the seat, so as to secure and preserve the angular position of the hubcap in relation to said sidewall.

5. An assembly according to claim 3, including at least one sliding bracket on the hubcap and a seat on the sidewall, said bracket being able to slide radially outwardly into the seat, so as to secure and preserve the angular position of the hubcap in relation to said sidewall.

6. An assembly according to claim 1, including a rubber protuberance on the outer surface of said sidewall and in which at least one extension is provided with an opening to receive the rubber protuberance.

7. An assembly according to claim 1, including at least one extension projecting radially from a sidewall toward the axis of rotation of the tire, at least one seat provided on the hubcap, the extension being designed to cooperate with the seat in order to secure and preserve the angular position of the hubcap in relation to said sidewall during the use of said assembly on a vehicle.

8. An assembly according to claim 1, wherein sidewall parts are in contact with hubcap parts, said parts being glued together in order to obtain a circumferential attachment between the hubcap and the tire.

9. An assembly according to claim 1, in which the hubcap is made of a rubber compound.

10. As assembly according to claim 1, wherein an ornamental motif is produced on one of the sidewalls and an ornamental motif is produced on the hubcap, said two ornamental motifs coinciding to produce a composite motif.

11. As assembly designed for a vehicle and comprising a mounting wheel, a tire having sidewalls between a tread and beads of said tire which come in con tact with said mounting wheel after mounting the tire on the wheel, and a wheel hubcap axially fastened on the wheel through the tire so as to be rotatably movable with the tire on said wheel, characterized in that the hubcap contains at least one extension projecting radially to one of the sidewalls of the tire, each extension having a deformation elasticity suitable for following the deformations of the sidewall during rolling, said extension having lateral faces and in which at least one relief is formed on one of the side walls, said relief having lateral faces inclined with an angle different from zero with the circumferential direction, said lateral faces of the radial extension of the hubcap cooperating with the lateral faces of the relief on the tire sidewall in order to secure a desired angular position of the hubcap in relation to the sidewall and to maintain said angular position during use of the assembly.

\* \* \* \* \*

UNITED STATES PATENT AND TRADEMARK OFFICE
CERTIFICATE OF CORRECTION

PATENT NO. : 6,257,675 B1
DATED : July 10, 2001
INVENTOR(S) : Leynaert

It is certified that error appears in the above-identified patent and that said Letters Patent is hereby corrected as shown below:

<u>Title page,</u>
Item [73], Assignee "Générales" should read -- Générale --

<u>Column 1,</u>
Line 51, "f" should be deleted

<u>Column 3,</u>
Line 6, "defenses" should read -- defines --

<u>Column 5,</u>
Line 11, "circumferential" should read -- circumferential, --

<u>Column 6,</u>
Line 18, "con tact" should read -- contact --
Line 27, "side walls," should read -- sidewalls, --

Signed and Sealed this

Seventeenth Day of September, 2002

Attest:

JAMES E. ROGAN
*Attesting Officer*     *Director of the United States Patent and Trademark Office*